June 2, 1964 | L. H. LEE | 3,135,897
AMPLITUDE DETECTOR
Filed March 30, 1960
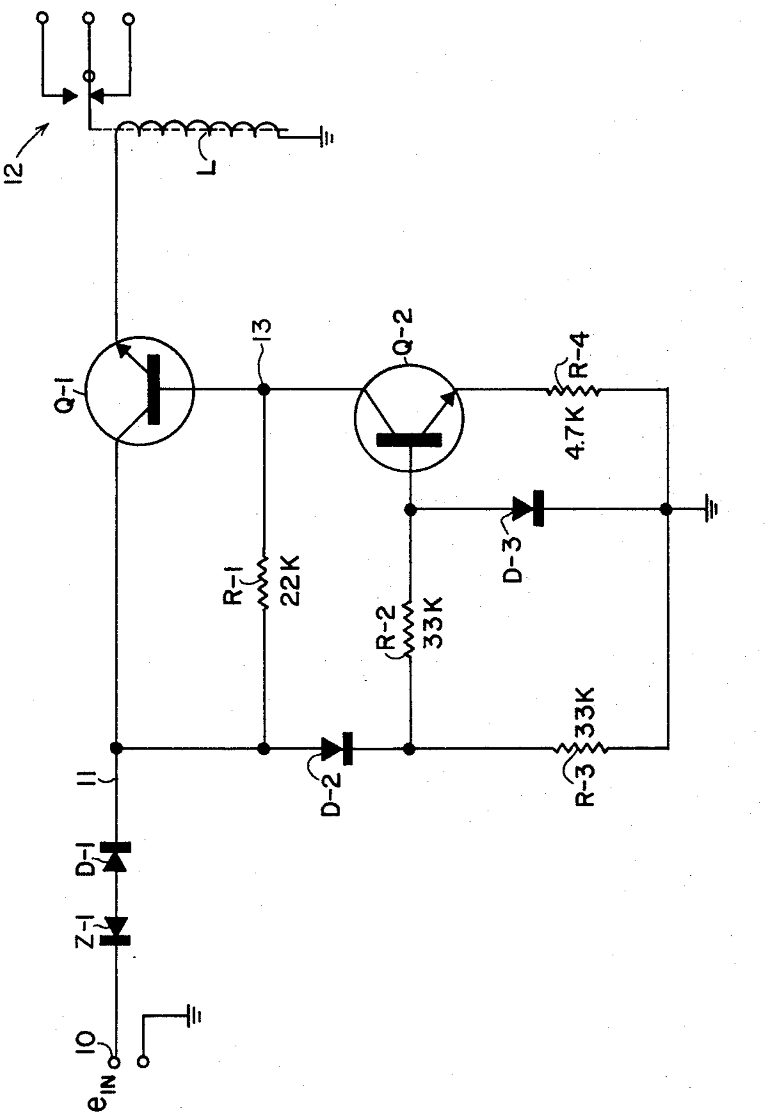
INVENTOR.
LESTER H. LEE
BY Edward A. Robinson
ATTORNEY United States Patent Office 3,135,897

Patented June 2, 1964

3,135,897
AMPLITUDE DETECTOR

Lester H. Lee, Mountain View, Calif., assignor to General Precision, Inc., Binghamton, N.Y., a corporation of Delaware Filed Mar. 30, 1960, Ser. No. 18,763
3 Claims. (Cl. 317—148.5)

This invention relates to an amplitude detector circuit, and more particularly, to a switching circuit which will drive a load circuit such as a relay whenever, and only whenever, a varying input voltage to the circuit exists between two predetermined levels.

Amplitude detector circuits are frequently used in analog computing devices, automatic control, instrumentation and simulation apparatus. One common prior art amplitude detector has utilized a diode biased to conduct when a desired input voltage switching level has been exceeded, and an amplifier connected to operate a relay after the diode conducts. For bi-directional operation equivalent to that of the present invention the prior art technique required at least two diodes, two amplifiers and two relays. The present device is much simpler and more economical, and it functions with considerable accuracy.

It is a primary object of this invention to provide an improved switching circuit for operating a relay whenever, and only whenever, an applied input voltage exists between two predetermined voltage levels.

Another object of this invention is to provide an amplitude detecting circuit which is economical to manufacture and which is operable without the use of a battery or an external power source.

Other objects of the invention will, in part, be obvious and will, in part, appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing in which:

The single FIGURE is an illustrative embodiment of the invention.

Referring to the FIGURE, the positive applied input voltage, or control voltage, is applied between a terminal 10 and a reference potential, shown as ground. The voltage may be considered to be applied across a series circuit comprising a zener diode Z–1, an ordinary silicon diode D–1 and the impedance between a conductor 11 and ground. If the input voltage is negative, the diode D–1 will block the flow of all current and a coil L of a relay 12 will remain de-energized. As the input voltage increases positively from zero, no current flows until the input voltage reaches a predetermined value. If the input voltage increases positively to $(Z_1+D_1)$ volts, where $Z_1$ and and $D_1$ are the zener breakdown voltage and forward voltage drop of the zener diode Z–1 and the silicon diode D–1, respectively, the zener diode Z–1 will conduct current, and the input voltage E, less $(Z_1+D_1)$, will be applied across the collector-emitter circuit of an NPN transistor Q–1 and the relay coil L, and because the transistor Q–1 will conduct, the relay coil L will be energized. The relay coil L, the transistor Q–1, the diode D–1 and the zener diode Z–1 are selected so that the current which flows through the coil L upon the zener breakdown of Z–1 equals or slightly exceeds the required relay "pull-in" current.

The zener diode Z–1 may in itself be considered to be a voltage sensitive means or the zener diode Z–1 together with the forward bias diode D–1 may constitute the voltage sensitive means operable to pass a biasing current to the transistor Q–1 when the input voltage $e_{in}$ exceeds a first pre-determined level. Thus, the voltage sensitive means Z–1 and D–1 operates to maintain the transistor Q–1 cut off until the input voltage level $e_{in}$ becomes equal to $(Z_1+D_1)$, and when the input voltage exceeds this level the voltage sensitive means will render the transistor Q–1 conductive.

As the input voltage $e_{in}$, further increases positively, increased current will flow through the transistor Q–1 and the relay coil L, and the relay will remain energized until the input voltage exceeds a value of $$(Z_1+D_1+D_2)$$

the upper limit where $D_2$ is the forward voltage drop across a diode D–2.

At the upper switching value of $(Z_1+D_1+D_2)$, current begins to flow through the diode D–2 to the base of an NPN transistor Q–2, causing conduction of the transistor Q–2. The current flow from the conductor 11 through a resistor R–4, causes a drop in voltage at a point 13 coupled to the base terminal of the transistor Q–1, thereby cutting off current flow in the transistor Q–1 and consequently de-energizing the relay coil L.

The diode D–2 may consttiute, in itself, a second voltage sensitive means or alternatively, the diode D–2 together with the transistor Q–2 may be considered as the second voltage sensitive means operable to bias the first transistor Q–1 into non-conduction when the input voltage $e_{in}$ exceeds a second pre-determined level equal to $(Z_1+D_1+D_2)$. Therefore, the transistor $Q_1$ will be non-conductive when the input volatge $e_{in}$ is at a low level less than $(Z_1+D_1)$, and likewise will be non-conductive when the input voltage is at a high level exceeding $$(Z_1+D_1+D_2)$$

The transistor Q–1 will be conductive and will operate the relay 12 or other load circuit only when the input voltage $e_{in}$ is in a band of voltages greater than a first pre-determined level but less than a second pre-determined level. The width of the band of voltages for energizing the relay coil L is equal to the forward drop across the diode D–2, and the choice of the diode used as D–2 will determine the relay closed range. Two or more such diodes may be connected in series, if it is desired to expand this range beyond the forward bias drop voltage obtainable from a single diode.

As the input voltage goes further positive, a bleeder diode D–3 passes increasing current and maintains the bias of the transistor Q–2 at the diode D–3 forward voltage drop value, thereby maintaining the transistor Q–2 conducting and the transistor Q–1 cut off. Thus, it will be seen that as the input voltage increased positively from zero, the circuit operates to apply currents to the relay coil L between input voltages of $(Z_1+D_1)$ and $(Z_1+D_1+D_2)$.

In some embodiments of the invention it will be considered desirable to use a zener diode (having a breakdown voltage $Z_2$) in lieu of diode D–2, in which case the upper switching voltage level will be of a value $$(Z_1+D_1+Z_2)$$

The range of the input voltage during which current is applied to the relay coil L will be seen to correspond to the forward voltage drop $D_2$ of the diode D–2, or the breakdown voltage $Z_2$ in the mentioned alternative circuit.

By replacing the NPN transistors shown with PNP transistors, and by reversing the directions of each of the diodes shown, the circuit will detect negative input voltages in similar manner. It will be seen that a single accurate and economical amplitude detector has been disclosed. It may be noted that no reactive circuitry is used, although the load may be reactive, so that time delays are not introduced by the present invention.

An additional advantage of the amplitude detector of this invention lies in the fact that no voltage source is required for its operation other than the input voltage which is being detected. Thus, no batteries or power supply circuits are necessary.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An amplitude detector circuit for receiving an input voltage capable of variation over a range and for energizing a load device when the input voltage is greater than a first pre-determined level and less than a second pre-determined level, said circuit comprising a first transistor having an emitter electrode, a base electrode and a collector electrode and coupled to the load device whereby the load device is energized when the transistor is conductive, a zener diode coupled between the input voltage and the collector electrode of the transistor, said zener diode being operable to isolate the input voltage from the transistor when the input voltage is less than the first pre-determined level and being further operable when the input voltage exceeds the first predetermined level to pass a current which will bias the first transistor into conduction, a second transistor coupled between the base electrode of the first transistor and a reference potential, a second diode coupled between the zener diode and the base electrode of the second transistor and operable when the input voltage exceeds the second pre-determined level to pass a current to render the second transistor conductive, said second transistor being operable when conductive to bias the base electrode of the first transistor such that the first transistor is rendered non-conductive.

2. The amplitude detector circuit in accordance with claim 1 and further comprising a forward biased diode coupled in series with the zener diode between the input voltage and the collector electrode of the first transistor, said forward biased diode being operable when the input voltage is of reversed polarity to block the flow of current and to maintain the first transistor non-conductive.

3. An amplitude detector switching circuit connected to receive an input voltage capable of variation over a range, said circuit being operable to energize a load impedance whenever, and only whenever, said input voltage is between first and second voltage values each within said range, comprising in combination; circuit means for applying said input voltage across a first series circuit including a zener diode, a first forward-biased diode, a first terminal, a second forward-biased diode and a first resistance, thereby to cause current flow through said first series circuit when said input voltage exceeds the breakdown voltage of said zener diode and the forward drop voltages of said first and second forward-biased voltages; a second series circuit connected in parallel with said second diode and said first resistance, said second circuit comprising a second resistance, the collector-emitter circuit of a first transistor and a third resistance; a fourth resistance connected between said first series circuit and the base of said first transistor to forward-bias said transistor whenever current flows in said first series circuit; a third series circuit, comprising the collector-emitter circuit of a second transistor and a load impedance, connected in parallel with said second series circuit; said second series circuit being connected to the base of said second transistor to cut off current flow in said second transistor whenever current flows in said second series circuit.

References Cited in the file of this patent

UNITED STATES PATENTS

| | | |
|---|---|---|
| 2,892,953 | McVey | June 30, 1959 |
| 2,942,123 | Schuh | June 21, 1960 |
| 2,949,546 | McVey | Aug. 16, 1960 |
| 2,959,717 | Conger | Nov. 8, 1960 |
| 3,041,469 | Ross | June 26, 1962 |

OTHER REFERENCES

Publication (A): "Electronic Design," May 27, 1959, page 46, Ideas for Design, Victor P. Holec.

Publication (B): Dept. of Army Technical Manual, TM 11–672, "Pulse Techniques," October 1951 (page 22).